United States Patent [19]

Chen et al.

[11] Patent Number: 5,234,989

[45] Date of Patent: Aug. 10, 1993

[54] STABLE CHLORINATED RESIN LATEX

[75] Inventors: John C. Chen, Hockessin, Del.; Royce E. Ennis, Silsbee, Tex.

[73] Assignee: E. I. Du Pont de Nemours and Company, Wilmington, Del.

[21] Appl. No.: 863,635

[22] Filed: Apr. 6, 1992

[51] Int. Cl.$^5$ .............................................. C08L 31/00
[52] U.S. Cl. ........................... 524/556; 524/562; 524/564
[58] Field of Search ...................... 524/556, 564, 562

[56] References Cited

U.S. PATENT DOCUMENTS

| | | | |
|---|---|---|---|
| 3,632,671 | 1/1972 | Furakawa et al. | 260/876 |
| 4,173,669 | 11/1979 | Ashida et al. | 524/556 X |
| 4,485,131 | 11/1984 | Adams et al. | 524/556 X |
| 4,529,762 | 7/1985 | Hoefer et al. | 524/564 X |
| 4,540,736 | 9/1985 | Herten et al. | 524/556 |
| 4,870,128 | 9/1989 | Couturier et al. | 524/556 |
| 4,996,259 | 2/1991 | Koehler et al. | 524/556 X |
| 5,086,093 | 2/1992 | Miller | 524/556 X |
| 5,102,946 | 4/1992 | Chen et al. | 524/529 |

FOREIGN PATENT DOCUMENTS

| | | | |
|---|---|---|---|
| 58-127752 | 7/1983 | Japan . | |
| 59-004637 | 11/1984 | Japan . | |
| 1223146 | 9/1989 | Japan | 524/211 |

Primary Examiner—Joseph L. Schofer
Assistant Examiner—J. M. Reddic
Attorney, Agent, or Firm—Marilyn H. Bromels

[57] ABSTRACT

Self-stabilized resin latexes are provided which contain carboxylate salts of post-chlorinated ethylene copolymers having chlorine contents of 20–60 weight percent. The ethylene copolymer salts are derived from ethylene/acrylic acid or ethylene/methacrylic acid copolymers containing 1.5–12 mole percent copolymerized units of acrylic or methacrylic acid. The latexes are particularly useful for preparing resorcinol formaldehyde adhesives.

7 Claims, No Drawings

STABLE CHLORINATED RESIN LATEX

BACKGROUND OF THE INVENTION

This invention relates to aqueous chlorinated olefin copolymer latexes which are useful in the preparation of adhesives and coating compositions.

Chlorinated olefin polymers have been used as binder resins in adhesive and coating compositions for many years because the presence of chlorine along the saturated polymer backbone imparts chemical resistance and outdoor weatherability to these products. Such compositions have therefore been especially suited for use in moisture resistant adhesives and marine and industrial coatings. Although the performance characteristics of these products has been excellent, the use of such compositions has declined over the years because they are solvent-based. Heightened concern regarding the environmental impact and health hazards associated with compositions of high volatile organic content (VOC) has led to a preference in the industry for aqueous latex coating and adhesive compositions.

Limited attempts have been made to develop aqueous chlorinated resin latex compositions, the objective being to maintain chemical and moisture resistance while minimizing VOC, but such attempts have met with only limited success. The high surfactant level necessary to obtain stable latexes adversely affects adhesion and, in addition, moisture barrier properties of coatings derived from the latexes have also proved to be inadequate.

The present invention provides stable aqueous chlorinated latex compositions which are self-stabilized as a result of their chemical structure. Therefore, the use of conventional surfactants is not required and the problems associated with the presence of large amounts of surfactants are eliminated.

SUMMARY OF THE INVENTION

More specifically this invention is directed to a stable chlorinated resin latex composition comprising an aqueous suspension of a salt of a post-chlorinated copolymer of ethylene and an alpha, beta-unsaturated acid selected from the group consisting of acrylic acid and methacrylic acid, said chlorinated copolymer having a chlorine content of 20-60 weight percent, the ethylene copolymer prior to chlorination containing 1.5-12 mole percent copolymerized units of alpha, beta-unsaturated acid. These compositions are particularly useful as binder resins in weatherable adhesive and coating compositions.

DETAILED DESCRIPTION OF THE INVENTION

The latex compositions of the present invention contain a partially or completely neutralized salt of a chlorinated ethylene/acrylic acid copolymer or a chlorinated ethylene/methacrylic acid copolymer. The high degree of polymer backbone chlorination contributes to the excellent chemical resistance and physical properties of films prepared from these copolymers, while the presence of a controlled amount of neutralized carboxylic acid groups is responsible for latex stability. As used herein the phrase stable latex means that the latex composition does not form a substantial amount of coagulum on standing within a period of two weeks at room temperature and is redispersible on gentle mixing. The acid salt groups promote latex stabilization because they function as internal surfactants by enabling the development of stable interactions with the hydrated environment external to the latex particle.

The chlorinated ethylene/acrylic acid or ethylene/methacrylic acid salts are carboxylates of post-chlorinated ethylene/acrylic acid copolymers or post-chlorinated ethylene/methacrylic acid copolymers. That is, chlorine is introduced into the polymer by backbone chlorination of the ethylene/acid copolymer rather than by copolymerization of chlorine-containing monomers. The ethylene copolymers, prior to chlorination, contain 1.5-12 mole percent copolymerized units of acrylic acid or methacrylic acid. The copolymers may be chlorinated ethylene/acrylic acid or ethylene/methacrylic acid bipolymers. Optionally, they may also contain copolymerized units of one or more other unsaturated compounds, such as $C_1-C_8$ alkyl acrylates, $C_1-C_8$ alkyl methacrylates, vinyl esters of saturated $C_2-C_{18}$ carboxylic acids, and carbon monoxide. Examples of such compositions include chlorinated and chlorosulfonated ethylene/(meth)acrylic acid bipolymers as well as chlorinated ethylene/vinyl acetate/acrylic acid copolymers, chlorosulfonated ethylene/vinyl acetate/acrylic acid copolymers, chlorinated ethylene/methyl acrylate/acrylic acid copolymers, chlorosulfonated ethylene/ethyl acrylate/acrylic acid copolymers, chlorinated ethylene/vinyl acetate/methacrylic acid copolymers, chlorosulfonated ethylene/butyl acrylate/methacrylic acid copolymers, chlorinated ethylene/glycidyl methacrylate/acrylic acid copolymers, chlorosulfonated ethylene/carbon monoxide/acrylic acid copolymers and ethylene/sulfur dioxide/acrylic acid copolymers. These polymers are known in the art and some are available commercially. They are prepared by solution or suspension chlorination of the ethylene/acrylic acid or ethylene/methacrylic acid copolymers. For example, the chlorosulfonated ethylene copolymers are prepared by reaction of the appropriate ethylene/acid copolymer with chlorine and sulfur dioxide or sulfuryl chloride in a chlorinated solvent in the presence of a free radical initiator. The acid copolymers themselves are generally prepared by copolymerization of ethylene and acrylic acid or methacrylic acid and any additional comonomer by high pressure free-radical polymerization to produce a branched polymer. Neutralization of the acid groups to form the copolymer salts is preferably effected during latex preparation.

The carboxylic acid salt moieties produced by neutralization of said acids act as effective internal surfactants because they are homogeneously dispersed at the interface between the latex particle and the external aqueous environment. The amount of copolymerized acid units present in the ethylene copolymer, prior to chlorination, is therefore a controlling factor in stabilization of the latex compositions of the invention. Compositions derived from ethylene/acrylic acid or methacrylic acid copolymers containing less than about 1.5 mole percent copolymerized acid require the use of added surfactants in order to be formulated into stable latexes. In contrast, preparation of latexes derived from ethylene copolymers containing above 12 mole percent copolymerized acid is difficult because the viscosity of some of these latexes is quite high and the production of the ethylene copolymer base resins is difficult. In cases wherein the chlorinated ethylene copolymer salts contain other acidic groups or acid-generating functionalities these groups will enhance the ability of the copolymer to act as its own surfactant. For example, the chlorosulfonyl groups present in chlorosulfonated ethylene acrylic or methacrylic acid copolymers will hydrolyze during preparation of the copolymer salt and are capable of being neutralized along with the carboxylic acid groups present in the copolymer.

Chlorinated ethylene copolymer salts suitable for use in the invention contain about 20–60 weight percent chlorine, preferably 30–55 weight percent chlorine, and have number average molecular weights of about 5,000 to about 100,000. Chlorine levels within the range disclosed promote the formation and effectiveness of chain entanglement which contributes to film toughness and strength. In addition, this level of chlorine in the copolymer salt improves resistance to attack by acids and bases. Therefore, if the chlorine level is below about 20 weight percent the chemical resistance of films derived from the compositions will be compromised. Also, adhesives derived from the compositions would be soft and lack sufficient tensile strength to form strong films.

Neutralization of the chlorinated ethylene copolymer resin is effected by treatment with aqueous solutions of organic or inorganic bases. Typical bases which act as neutralizing agents include potassium hydroxide, sodium hydroxide, ammonium hydroxide, ammonia, diethanolamine, triethanolamine, triethylamine, and ethanolamine. Although it is preferable to add sufficient base to neutralize 50–100% of the acid groups present, for certain applications neutralization levels as low as 10% are adequate to produce a latex which is self-stabilizing.

The latexes of the invention are generally prepared by intimately mixing an organic solvent solution of the chlorinated ethylene copolymer and aqueous base under high shear mixing conditions, for example in a homomixer, a high-shear blender, or a combination of centrifugal pumps. The amount of aqueous base added is such that the solids content of the latex is from 5–75%, the degree of neutralization of the acid copolymer is at least 10%. Since the latex is self-stabilized it is not necessary to employ surfactants during latex preparation. That is, the latex is substantially free of surfactants and yet an emulsion is obtained which provides films having excellent adhesivity. However, small amounts of anionic or nonionic surfactants can be present in cases where it is desired to further reduce the particle size of the latex. Amounts of surfactant up to about 1% by weight of the chlorinated resin salt are sufficient for this purpose. At this low level, there is no adverse effect on adhesion. The resultant emulsion may be further refined by removal of the organic solvents, and such removal is preferred for the preparation of low VOC coatings and adhesives.

Conventional additives, such as fillers, thickeners, pigments, antioxidants, curatives, and flame retardants may also be added to the stable aqueous latexes depending on the particular end-use which is desired.

The latexes are suitable for use in the preparation of marine paints, traffic paints, and resorcinol formaldehyde resin adhesives. They are particularly useful for preparing resorcinol formaldehyde adhesives. Such adhesive compositions usually contain about 1.5–15 weight percent formaldehyde, about 1.0–10 weight percent resorcinol, and about 5–30 weight percent chlorinated latex in the presence of conventional cure catalysts such as a combination of sodium and ammonium hydroxides.

The invention is further illustrated by the following embodiments wherein all parts are parts by weight unless otherwise specified.

EXAMPLES

Example 1

A stable latex containing a sodium salt of a chlorinated ethylene/methacrylic acid copolymer was prepared as follows. A 150 g sample of chlorinated ethylene/methacrylic acid (chlorine content 37.7%; prepared from an ethylene/methacrylic acid copolymer containing 5.3 mole % methacrylic acid, melt index 200 g/10 minutes) was dissolved in 920 g toluene. To this was added 1395 ml of a 0.24% aqueous sodium hydroxide solution and the resultant solution was mixed with a high-speed Waring ® blender for approximately 5 minutes until a finely divided oil/water emulsion was formed. The emulsion was treated with steam under vacuum to remove the toluene and yielded 1050 g of polymer latex having a solids content of approximately 13%. To this latex was added 34 g of a 1% aqueous hydroxyethylcellulose solution. After 40 hours two layers had formed, a clear layer containing no polymer, and a milky layer containing the polymer latex. The clear layer was decanted leaving 284 g of a stable latex having a solids content of 47%.

Resorcinol formaldehyde adhesive latexes (RFL) were prepared from the latex by mixing 40 parts of a 4.72% aqueous resorcinol solution, 2.77 parts of a 37% aqueous formaldehyde solution, and 36.5 parts of the 47% solids copolymer latex and 20 parts of 15% aqueous sodium hydroxide (catalyst); adjusted to 20.6% solids with water and brought to a pH of 9.9 by addition of a 28% aqueous ammonium hydroxide solution. Nylon 66 fabric was treated with the RFL and heat activated. The treated fabric was then passed between two slabs of chlorosulfonated polyethylene compounded with 10 phr (parts per hundred parts rubber) magnesium oxide, 20 phr litharge, 40 phr SRF carbon black, 2 phr dipentamethylenethiuram tetrasulfide, 0.25 phr bis-benzothiazonyl sulfide and 3 phr nickel dibutyldithiocarbamate. The rubber slabs were then cured for 30 minutes at 153° C. The force required to pull the rubber and fabric apart, determined according to ASTM D-2138, was 28 pli with 80% rubber tear.

EXAMPLE 2

A stable latex containing a sodium salt of another chlorinated ethylene/methacrylic acid copolymer was prepared in the same manner as described in Example 1, except that the chlorinated copolymer which was used had a chlorine content of 42 weight %, and 1215 ml of 0.5% aqueous sodium hydroxide was added to the polymer/toluene mixture to produce an emulsion and to neutralize the acid groups. The chlorinated resin was prepared from an ethylene/methacrylic acid copolymer containing 5.3 mole % methacrylic acid which had a melt index of 200 g/10 minutes.

Resorcinol formaldehyde adhesive latexes (RFL) were prepared as in Example 1 except that 3.07 parts of a 1.67% aqueous sodium hydroxide solution (catalyst) was used. A 28% aqueous ammonium hydroxide solution was used to bring the pH to 9.9. Nylon 66 fabric was treated with the RFL and heat activated. The treated fabric was pressed between two slabs of chlorosulfonated polyethylene compounded as described in Example 1. The rubber slabs were cured for 30 minutes at 153° C. The force required to pull the rubber and fabric apart, determined according to ASTM D-2138, was 33 pli with 100% rubber tear.

EXAMPLE 3

A stable latex containing an ammonium salt of a chlorosulfonated ethylene/vinyl acetate/acrylic acid copolymer latex was prepared as follows. Thirty parts of chlorosulfonated ethylene/vinyl acetate/acrylic acid copolymer [50.7% chlorine, 1.5% sulfur; prepared from an ethylene/vinyl acetate/acrylic acid copolymer containing 6.8 weight % vinyl acetate and 10.2 weight % acrylic acid (4.4 mole % acrylic acid), Brookfield viscosity 430 centipoise at 140° C.] was dissolved in 45 parts toluene. The toluene solution was mixed with four times by volume of aqueous ammonium hydroxide having a pH of 10 in a TEKMAR ® homomixer for a time sufficient to form a finely divided oil in water emulsion. Some readily dispersible sediment formed, but coalescence of the latex did not occur.

EXAMPLE 4

Thirty parts of a chlorosulfonated ethylene/vinyl acetate/acrylic acid copolymer [51.3% chlorione, 1.8% sulfur; prepared from an ethylene/vinyl acetate/acrylic acid copolymer containing 3.5 weight % vinyl acetate and 4.5 weight % acrylic acid (1.8 mole % acrylic acid), Brookfield viscosity 630 centipoise at 140° C.] was dissolved in 45 parts toluene. The solution was mixed with four times by volume of aqueous ammonium hydroxide having a pH of 10 in a TEKMAR ® homomixer for a time sufficient to form a finely divided stable latex containing an ammonium salt of the chlorosulfonated ethylene/vinyl acetate/acrylic acid copolymer. A small amount of readily dispersible sediment formed, but coalescence of the latex did not occur.

We claim:

1. A stable chlorinated resin latex composition comprising an aqueous suspension of a salt of a post-chlorinated copolymer of ethylene and an alpha,beta-unsaturated acid selected from the group consisting of acrylic acid and methacrylic acid, said chlorinated copolymer having a chlorine content of 20–60 weight percent, the ethylene copolymer prior to chlorination containing 1.5–12 mole percent copolymerized units of alpha,beta-unsaturated acid.

2. The composition of claim 1 wherein the post-chlorinated copolymer is a chlorinated copolymer of ethylene and acrylic acid.

3. The composition of claim 1 wherein the post-chlorinated copolymer is a chlorinated copolymer of ethylene and methacrylic acid.

4. The composition of claim 1 wherein the post-chlorinated copolymer is a chlorosulfonated copolymer of ethylene and acrylic acid.

5. The composition of claim 1 wherein the post-chlorinated copolymer is a chlorosulfonated copolymer of ethylene and methacrylic acid.

6. The composition of claim 3 wherein the chlorinated copolymer of ethylene and methacrylic acid is a chlorinated ethylene/methacrylic acid bipolymer.

7. The composition of claim 4 wherein the chlorosulfonated copolymer is chlorosulfonated ethylene/vinyl acetate/acrylic acid.

* * * * *